Oct. 12, 1926.

A. C. CRIMMEL

KITCHEN CABINET

Filed June 26, 1923

1,603,028

ON LINE. 3-3. FIG.1.

ON LINE. 4-4. FIG.2.

INVENTOR:
Alvie C. Crimmel.
BY
ATTORNEYS.

Patented Oct. 12, 1926.

1,603,028

UNITED STATES PATENT OFFICE.

ALVIE C. CRIMMEL, OF HARTFORD CITY, INDIANA.

KITCHEN CABINET.

Application filed June 26, 1923. Serial No. 647,782.

My present invention relates to a kitchen cabinet and more particularly to a container for condiments and similar articles which are normally concealed within the container and upon the opening of the door the jars in which the condiments are contained are brought into a position accessible to the user, its construction being such that the jars are always maintained in substantially a horizontal position.

A further object of my invention is to devise novel means for supporting jars containing condiment or other desired material in such a manner that when not in use they will be concealed within the box or container so that they can be maintained in a clean and sanitary condition at all times and when not in use cannot be subjected to the action of dirt, dust, greasy vapors or other foreign material, which would otherwise be liable to collect thereon.

With the foregoing and other objects in view which will hereinafter clearly appear, my invention comprehends a novel construction of a kitchen cabinet and more particularly a novel construction and arrangement of a jar container having a door which carries the jars in such a manner as to always maintain them in a horizontal position. When the door is closed, the jars are concealed within a container. The container is preferably made integral with the kitchen cabinet and its top serves as a storage for other articles. It will of course be apparent that it is within the scope of my invention to have the jar container detachable or removable, in order that it can be removed from the kitchen cabinet to a desired place of utilization, such as for example, a kitchen table or gas stove, coal range or other heating appliance.

Other novel features of construction and advantage will more clearly appear in the detailed description and the appended claim.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Similar numerals of reference indicate corresponding parts.

Figure 1:
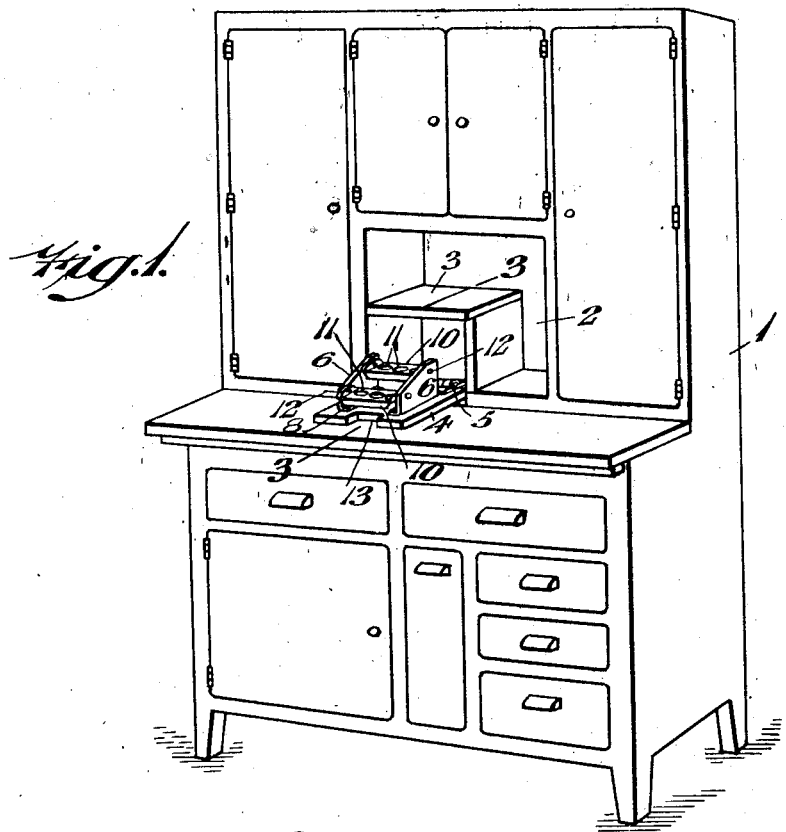
Figure 1 represents, in perspective, a kitchen cabinet in conjunction with which a container, embodying my invention, is employed.
Figure 2:
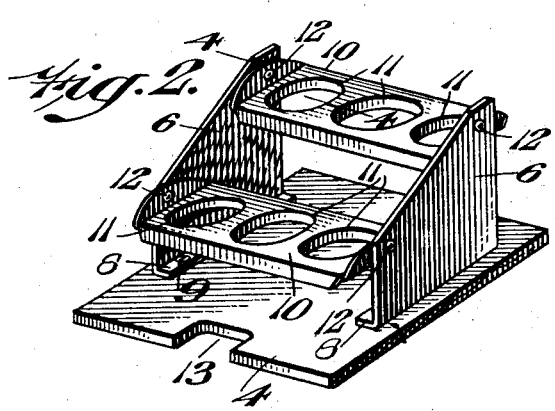
Figure 2 represents, in perspective and in detached position, the door of the container and the jar carrying rack.

Referring to the drawings, 1 designates a kitchen cabinet of any desired or conventional design having above its table top the compartment 2 which is adapted to receive a container 3.

4 designates a door which is hinged at 5 to the bottom of the container 1. 6 designates supporting brackets in the form of plates having split flanges 8 which are secured to the door by means of fastening devices 9 of any desired character so that the supporting bracket 6 will be rigidly connected with the door. 10 designates jar carrying racks which, for purpose of illustration, I have shown as provided with openings 11, the shape of which will conform to the shape of the jar which is to be used. These racks 10 are pivotally connected with the supporting bracket 6 at each of their ends by means of fastening devices 12. These racks 10 are preferably formed from sheet metal having depending front and rear flanges and upwardly deflected end flanges. The door 4 may be provided with any desired type of handle and, for purpose of illustration, I have shown it as having the recess 13 into which one or more fingers of the operator can be inserted to effect the opening of the door 4.

14 designates a jar the periphery of which will conform to the contour of the openings 11 and, in order to prevent the jar sliding through, it is provided intermediate its top and bottom with a rib 15. The jars 14 are adapted to contain the condiment or other desired material and their tops are provided in the conventional manner with a closure and, as illustrated, they are threaded at their upper ends to receive such closure.

Figure 3:
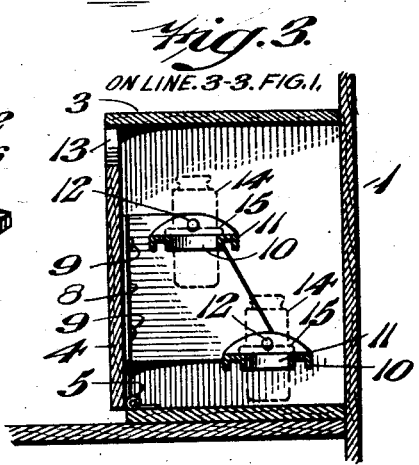
Figure 3 represents a section on line 3—3 of Figure 1.
Figure 4:
Figure 4 represents a section on line 4—4 of Figure 2.

In the operation, when the operator desires to use a jar he opens the door 4, as will be understood by reference to Figure 1, and as the door is opened the jar carrying racks 10 retain substantially a horizontal position. When the door is closed, as seen in Figure 3, it will be seen that the jar carrying racks are also retained in substantially a horizontal position so that in case they are uncovered there can be no spilling of the material contained in such jars.

My present invention can be economically manufactured and provides a closed container which can form an integral part of a kitchen cabinet, that is, it can be built into the kitchen cabinet or it can be formed as a removable unit which can be removed to any desired place of utilization.

When the jars are not in use the door 4 can be closed to prevent access of dirt, dust and foreign material to the jars and the material contained therein.

Although I have preferred to show the racks as made from sheet material with suitable openings in them in practice they would preferably be made of wire.

It will now be apparent that I have devised a new and useful kitchen cabinet which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

A kitchen cabinet including a complemental base, a top and a shelf, a compartment and a container arranged midway of the height of said base and top, a door hinged near its bottom edge to said compartment, oppositely located vertical supports having forwardly extending inclined tops and having their bases fixed to the inner face of said door adjacent its side edges, and a plurality of receptacle receiving racks having free, swinging movement between said vertical supports, and being arranged in superimposed planes, but not in vertical alignment, each rack comprising a thin, substantially flat plate having upturned side lugs pivoted to said vertical supports and having downwardly deflected flanges at the rack front and rear and also having a plurality of receptacle receiving openings therein, which are provided with downwardly deflected pendant flanges, said shelf being adapted to support said door in open horizontal position, with said racks in non-aligning parallel position.

ALVIE C. CRIMMEL.